May 14, 1935.    A. GRANT    2,001,062
PHOTOGRAPHIC ENLARGER
Filed June 18, 1934    2 Sheets-Sheet 1

Inventor
ALVIN GRANT
By [signature]
Attorney

May 14, 1935.  A. GRANT  2,001,062
PHOTOGRAPHIC ENLARGER
Filed June 18, 1934   2 Sheets-Sheet 2
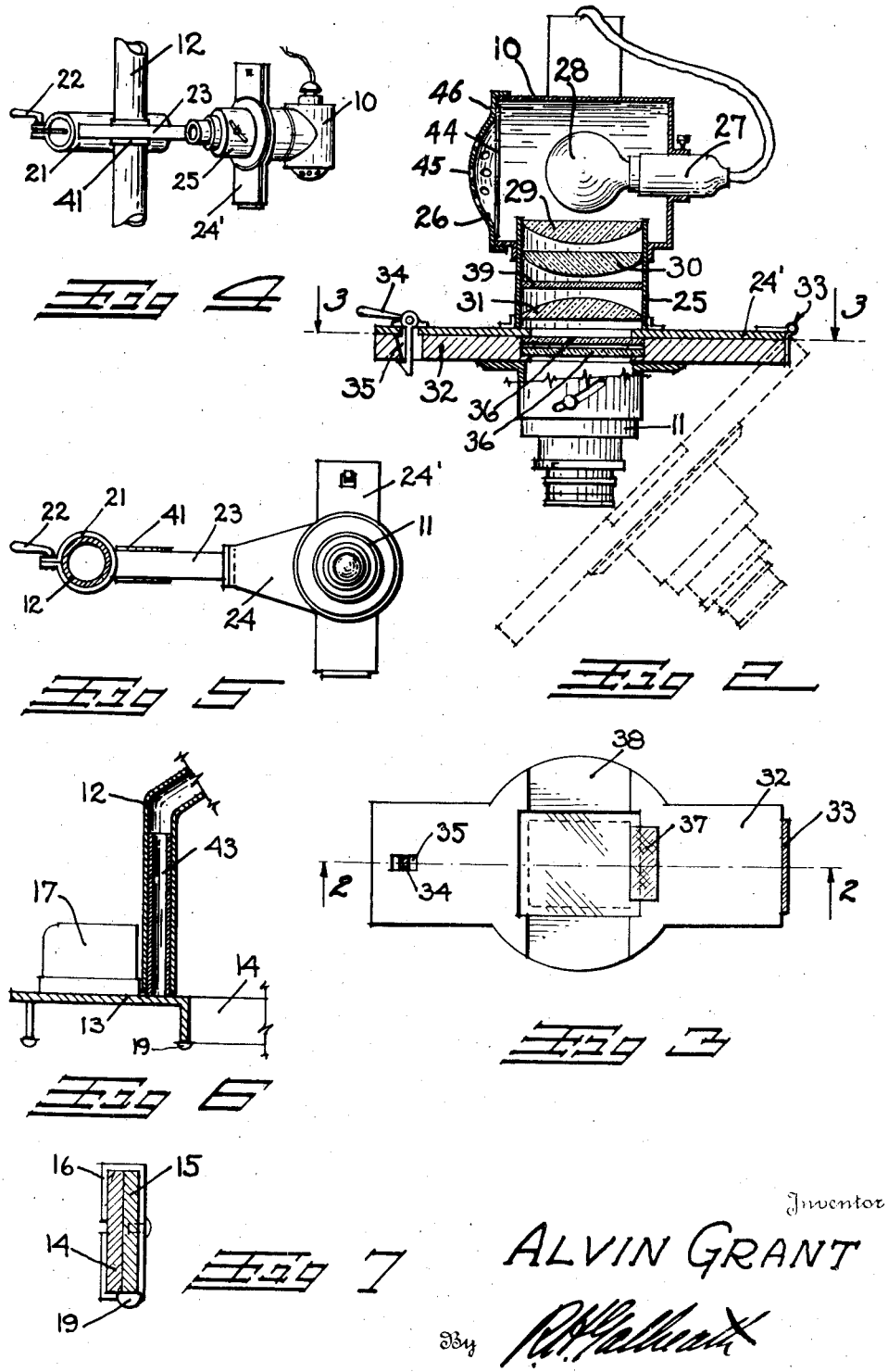
Inventor
ALVIN GRANT
By [signature]
Attorney Patented May 14, 1935

2,001,062

UNITED STATES PATENT OFFICE 2,001,062

PHOTOGRAPHIC ENLARGER

Alvin Grant, Denver, Colo.

Application June 18, 1934, Serial No. 731,128

7 Claims. (Cl. 88—24)

This invention relates to a photographic enlarger of a type more particularly designed for use with the modern miniature camera films. The invention, however, is not limited to this particular use, but will be found valuable wherever it is desired to obtain exceedingly accurate enlargements of unlimited size from relatively small negatives or portions of negatives.

The principal object of the invention is to provide a photographic enlarging device of unusually small size and weight which can be rapidly and conveniently employed to produce enlargements of any desired size.

Other objects of the invention are: to eliminate the heat usually incident to the operation of an enlarger with its attendant inconveniences such as film destruction, buckling, etc., to provide an enlarger which can be operated in locations where electric lighting current is not available; to provide a film holding device in which either individual films or strips of films can be quickly and easily inserted or removed and in which the film can be slid to expose any desired portion thereof and yet will be held absolutely flat and accurately across the projection axis; and to provide a supporting structure which will be rigid, yet quickly adjustable to project images either on a horizontal table, the floor, or a vertical wall or screen.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 2 is a vertical section through the projecting portion of the device, taken on the line 2—2, Fig. 3.

Fig. 3 is a horizontal section, looking downward, taken on the line 3—3, Fig. 2.

Fig. 4 is a detail view illustrating the manner of placing the projector in the horizontal position when desired.

Fig. 5 is a bottom view, looking upward at the projector.

Fig. 6 is a detail section through the base of the supporting standard.

Fig. 7 is a detail section through one of the paper holder legs, taken on the line 7—7, Fig. 1.

Figure 1:
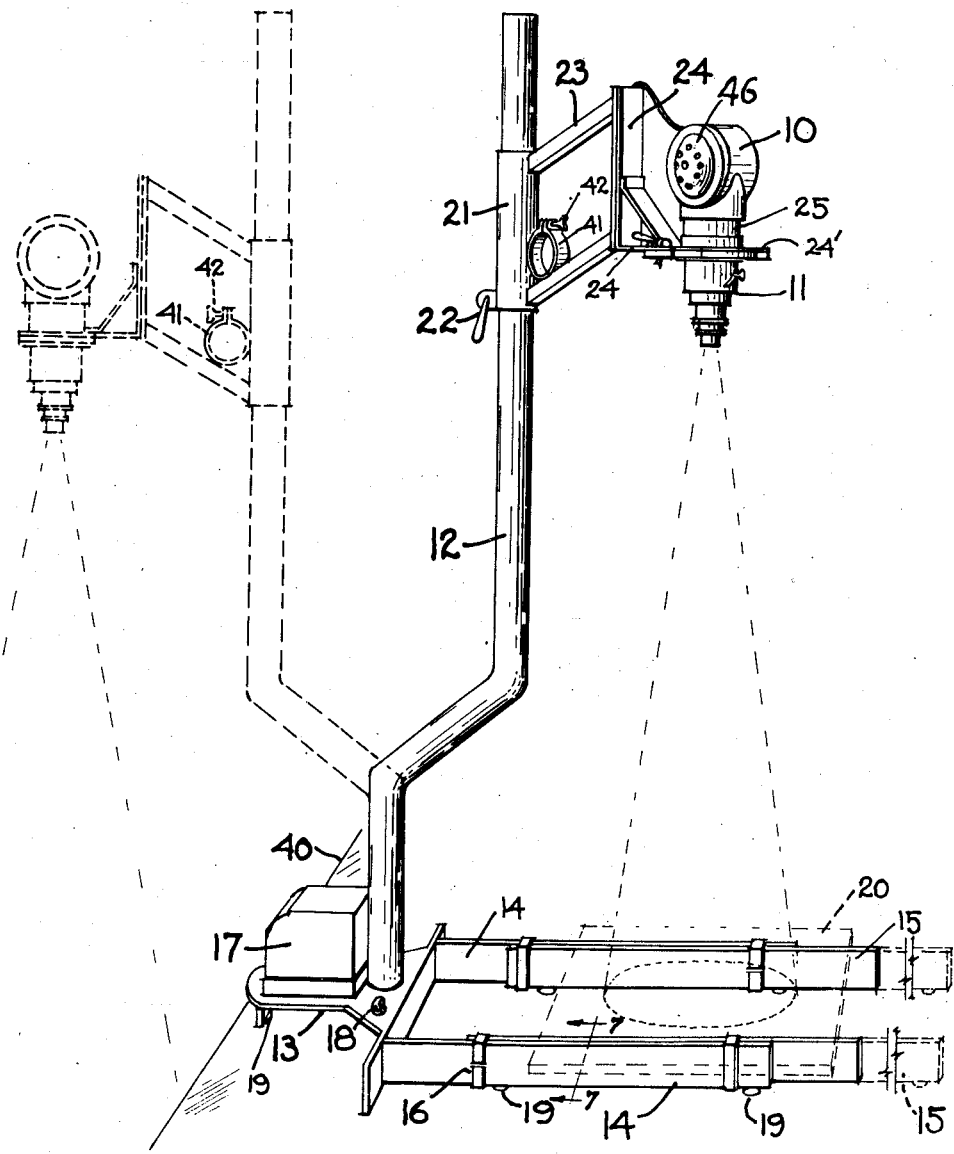
Fig. 1 is a perspective view of the complete photographic enlarger, illustrating it in solid line in the table projecting position and in broken line in the floor projecting position.

Briefly, the invention consists of a lamp housing 10 and a projection lense system 11, adjustably supported on an off-set standard 12, which is rotatably mounted on a suitable supporting base plate 13 from which extendable, supporting legs 14 project.

The standard 12 is very definitely offset to provide a relatively long vertical top portion and a relatively short vertical bottom portion. It is preferably formed of relatively light, rigid, metal tubing so that it may fit snugly over an upwardly projecting stud 43 on the base plate 13. The stud 43 firmly holds the standard 12 in the vertical position but allows it to be rotated about the stud when desired. Any suitable means may be provided, if desired, for locking the standard to the stud such as a set screw, clamping screw, etc.

The legs 14 are each provided with an extendable member 15 by means of which their lengths may be increased as desired. These extendable members may be telescopically fitted over the legs or slidably secured thereto by means of slide bands 16, as illustrated.

The base plate 13 is also used to support a small transformer 17, for supplying current to the projection lamp, and with a control switch 18, for controlling this current. Suitable feet or supporting buttons 19 are positioned beneath the legs 14 and the base plate 13 to support the latter above any suitable supporting surface. The legs 14 not only act to support and brace the entire structure, but also serve as a supporting frame for any suitable enlarging board or paper holder as indicated in broken line at 20.

A clamping sleeve 21 is movably mounted on the standard 12 and may be securely clamped thereon in any desired position by means of a suitable clamp screw 22. Bracket arms 23 project upwardly and outwardly from the sleeve 21 to support an L-shaped bracket plate 24.

The horizontal portion of the bracket plate 24 is preferably shaped as shown in Fig. 5. In the middle of this horizontal portion a light opening is formed over which a vertical condenser tube 25 is permanently mounted. The condenser tube 25 supports and opens to the relatively small, horizontally positioned lamp housing 10. One extremity of the lamp housing is closed by means of a removable, ventilated cap 26. The other extremity of the lamp housing is pierced by an adjustable, miniature lamp receptacle 27 for supporting and supplying current to a projection lamp 28.

It is desired to call particular attention to the lamp 28. This lamp is of the 6 volt type particularly designed for automotive headlights and receives its low voltage current supply from the transformer 17. Such a lamp has a condensed or concentrated filament which makes it particularly efficient for optical or projection work, it is very light in weight, gives relatively little heat and requires only a small, light, lamp housing. The low voltage current supply is harmless and excessive insulating precautions are unnecessary.

The condenser tube 25 carries an upper plano-convex lens 29 positioned with its flat side toward the lamp. A second similar lens 30 is similarly positioned, immediately below the lens 29, and at the bottom of the tube is a third similar lens 31 positioned with its convex side upwardly. A disc of opalescent or frosted glass 39 is positioned between the lenses 30 and 31.

The horizontal portion of the bracket plate 24 is formed with two oppositely extending ears 24', as shown in Fig. 5. Immediately below the ears 24' a plate, which will be herein designated the film plate 32, is hinged at its extremity upon a suitable hinge 33. The other extremity of the film plate 32 is supported by means of finger latch 34 which engages through a suitable receiving opening 35 in the film plate. The projecting lens system 11 is secured directly to the bottom of the film plate 32.

A rectangular light opening is formed through the film plate 32 corresponding to the light opening in the bracket plate 24 and registering with the latter. The light opening in the plate 32 is shouldered to support a pair of film receiving glasses 36. The lowermost glass 36 is permanently secured in the plate 32. The uppermost glass 36 is hinged to the top of the plate 32 by means of an adhesive fabric hinge 37.

The upper face of the top glass is flush or level with the upper face of the plate 32. The upper face of the lower plate is flush with a level with the bottom of a wide laterally positioned film groove 38 which extends across the upper face of the plate 32, at the light opening therein, for receiving a strip of miniature film.

If the enlargements are to be made from the popular 35 m. m. film or a similar miniature strip film, the film plate 32 is lowered, as indicated in broken line in Fig. 2; the upper glass plate 36 is lifted on its hinge and the film is laid across the plate 32 in the groove 38. The plate 36 and the plate 32 are then closed and the film strip may be slid back and forth therein to bring the desired negative opposite the light openings.

If the enlargement is to be made from a portion of a large negative (the device will receive any negative which can pass between the hinge 33 and the latch 34 which is preferably separated to receive a 5x7 film) the negative is placed upon the plate 32 over both the glass plates 36 and the plate 32 is closed on its latch 34. The film may then be shifted to bring any desired portion thereof over the light opening.

The lens system is preferably of a very short focus so that comparatively great enlargements can be made at comparatively short distances. The enlarger is designed to rest near the end and preferably near the front edge of the work table as indicated at 40, Fig. 1.

If the enlargement is to be comparatively small the paper is placed upon the enlarging board 20 resting directly upon the legs 14. The projector is then moved up or down the standard to produce the desired degree of enlargement. The standard is adjusted at its base and the sleeve 21 is rotated about the standard to properly position the image on the board. If a larger paper or board is used the leg extensions 15 may be withdrawn to provide a broader base.

If a still larger image is desired, the standard may be swung to the broken line position of Fig. 1 so as to swing the projector beyond the edge of the table. The enlarging paper may then be placed directly on the floor of the room and the projector adjusted on the standard in the usual manner.

If the extremely large enlargement possible on the floor is not sufficient a still greater one may be obtained by projecting the image against a vertical wall or screen at a greater distance from the projector. For this purpose a sleeve 41 is secured to, and at right angles with the sleeve 21 and provided with a clamp nut 42. By removing the sleeve 21 from the standard and slipping the sleeve 41 thereover the projector may be placed in a horizontal position on the standard as shown in Fig. 4. It may be secured at any desired height thereon by means of the clamp nut 42. This position may be also used for projecting positive pictures on a screen for display or lecture purposes.

It would be impossible to support a lamp housing for an ordinary projection lamp upon a standard of any length, owing to the great size and weight of the projector. An extremely heavy and rigid base and standard construction would be necessary to avoid ruinous vibration. The use of the small, light weight, automobile lamp, however, allows a very inexpensive and light weight supporting structure to be employed with a relatively long standard with accurate results.

The small globe has many other advantages. It gives off very little heat; it can be advantageously placed very close to the lenses so as to give a better light efficiency and reduce the size of the projecting mechanism; it can be operated from a car storage battery or dry cells so that the machine may be operated remotely from electric lighting service; its condensed filament gives a better focus and better light distribution; and it is much more economical to replace or renew.

The lateral position of the film groove positions the picture upright to the operator and not endwise as in the case of the usual longitudinal film tracks.

The employment of the three condensing lenses 29, 30 and 31, and their specific placement, together with the specifically placed ground glass 32 efficiently serves a double purpose. First, it absorbs and prevents any lamp heat from reaching the film. Second, it produces an absolutely uniform light distribution over the area of the film and it breaks the uniformly distributed parallel rays into reflected rays at a multitude of angles so as to produce a highly diffused effect which illuminates the grain of the film and prevents the showing of "grain" even on excessive enlargement.

A shield plate 44 is inserted to prevent the light rays from passing through ventilation perforations 45 formed in a removable cap 46 which closes the end of the lamp housing 10.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a photographic enlarger: a light housing; a lamp within said housing; a lens tube projecting from one side of said housing condensing lenses within said tube; a plate hinged below said lenses; projection lenses secured to said plate; and means for detachably securing said hinged plate with said projection lenses in alignment with said condensing lenses; a shouldered recess formed in said hinged plate; a first glass plate fitted in said recess; a second glass plate hinged in said recess above said first glass plate so as to receive a film therebetween; and a laterally extending film groove formed in said hinged plate at opposite sides of said glass plates, the bottom of said film groove being substantially in alignment with the upper face of said first glass plate.

2. In a photographic enlarging device having a vertical standard; a bracket member for supporting a projector; a vertical sleeve carried by said bracket member to fit over said standard; and a second sleeve carried by said bracket member also of a size to fit over said standard, said second sleeve being positioned with its axis at right angles to the axis of said first sleeve so that said bracket member may be positioned on said standard in either of two directions.

3. A photographic enlarging device comprising: a bracket member; means for supporting said bracket member; a horizontal shelf on said bracket member; a lens tube secured to and arising from said shelf; a horizontally positioned lamp housing over said lens tube; a lamp carried in said housing; condensing lenses in said lens tube; oppositely projecting ears formed on said shelf; a film plate hinged at its one extremity to one of said ears; a latch member supporting the opposite extremity of said film plate on the other of said ears; and a projecting lens system secured to the bottom of said hinge plate.

4. A photographic enlarging device comprising: a bracket member; means for supporting said bracket member; a horizontal shelf on said bracket member; a lens tube secured to and arising from said shelf; a horizontally positioned lamp housing over said lens tube; a lamp carried in said housing; condensing lenses in said lens tube; oppositely projecting ears formed on said shelf; a film plate hinged at its one extremity to one of said ears; a latch member supporting the opposite extremity of said film plate on the other of said ears; a projecting lens system secured to the bottom of said hinge plate, there being an aperture in said film plate to admit light from said condensing lenses to said projecting lens system; a shoulder formed in said aperture; a first glass plate resting on said shoulder; and a second glass plate hinged above said first glass plate within said aperture.

5. A photographic enlarging device comprising: a bracket member; means for supporting said bracket member; a horizontal shelf on said bracket member; a lens tube secured to and arising from said shelf; a horizontally positioned lamp housing over said lens tube; a lamp carried in said housing; condensing lenses in said lens tube; oppositely projecting ears formed on said shelf; a film plate hinged at its one extremity to one of said ears; a latch member supporting the opposite extremity of said film plate on the other of said ears; a projecting lens system secured to the bottom of said hinge plate, there being an aperture in said film plate to admit light from said condensing lenses to said projecting lens system; a shoulder formed in said aperture; a first glass plate resting on said shoulder; a second glass plate hinged above said first glass plate within said aperture; and a laterally extending film groove formed in said film plate and extending oppositely outward from said aperture, the bottom of said film groove aligning with the top of said first glass plate, and the top of said film plate aligning with the top of said second glass plate.

6. A photographic enlarging machine comprising: a horizontal bracket plate; means for supporting said horizontal bracket plate in an elevated position; a lens tube secured to and extending upwardly from said bracket plate; a lamp housing carried on and supported by said lens tube; oppositely projecting portions formed on said bracket plate; a lens plate of approximately similar contour to said bracket plate, said lens plate being hinged at one extremity to the extremity of one of said projecting portions and latched at its other extremity to the extremity of the other of said projecting portions; a projecting lens system secured to the lower face of said lens plate, said lens plate and said bracket plate being provided with openings in alignment with said lens tube; and means for supporting a film in the opening of said lens plate.

7. A photographic enlarging machine comprising: a horizontal bracket plate; means for supporting said horizontal bracket plate in an elevated position; a lens tube secured to and extending upwardly from said bracket plate; a lamp housing carried on and supported by said lens tube; oppositely projecting portions formed on said bracket plate; a lens plate of approximately similar contour to said bracket plate, said lens plate being hinged at one extremity to the extremity of one of said projecting portions and latched at its other extremity to the extremity of the other of said projecting portions; a projecting lens system secured to the lower face of said lens plate, said lens plate and said bracket plate being provided with openings in alignment with said lens tube; condensing lenses carried in said lens tube; a rectangular recess formed in said lens plate about the opening therein; a pair of hinged-together glass plates carried in said recess so that the uppermost surface of the uppermost glass plate aligns with the top surface of said lens plate.

ALVIN GRANT.